United States Patent
Bustelo et al.

(10) Patent No.: US 8,442,979 B2
(45) Date of Patent: May 14, 2013

(54) SYSTEM FOR CREATING MARKUP LANGUAGE DOCUMENTS AT A RECEIVING DISPLAY STATION FROM MULTIPLE SOURCES WITH MARKUP FOR DISPLAYING THE STATE OF SETS OF CONTENT REVIEWS

(75) Inventors: Leugim A. Bustelo, Austin, TX (US);
Andrew D. Hately, Austin, TX (US);
Julio E. Ruano, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1711 days.

(21) Appl. No.: 11/218,264

(22) Filed: Sep. 1, 2005

(65) Prior Publication Data

US 2007/0067339 A1    Mar. 22, 2007

(51) Int. Cl.
*G06F 7/00*    (2006.01)

(52) U.S. Cl.
USPC .......................................................... 707/736

(58) Field of Classification Search ............... 707/104.1, 707/736
See application file for complete search history.

(56) References Cited

U.S. PATENT DOCUMENTS

| | | | |
|---|---|---|---|
| 2003/0177041 A1* | 9/2003 | Millican et al. .................... | 705/3 |
| 2004/0019634 A1* | 1/2004 | Van Geldern et al. ........ | 709/203 |
| 2004/0163042 A1* | 8/2004 | Altman ......................... | 715/512 |

OTHER PUBLICATIONS

J. Reagle, XML Signature Reuirements, Jul. 2000, XML Signature Requirements, World Wide Web Consortium, RFC: 2807, http://www.ietforg/rfc/rfc2807.txt, pp. 1-8, the World Wide Web Consortium ("W3C").*

J. Reagle, XML Signature Reuirements, Jul. 200, XML Signature Requirements, World Wide Web Consortium, RFC: 2807, http://www.ietf.org/rfc/rfc2807.txt, pp. 1-8, the World Wide Web Consortium ("W3C").*

*Michigan Ross School of Business*, "Working Together Using Track Changes", Microsoft Word 2003, Anjal Smidt (Computing Services), pp. 1-8, 2003.

Shauna Kelly—Making the Most of Word in Your Business—www.shaunakelly.com—"How to use the Reviewing Toolbar in Microsoft Word 2002 and Word 2003", Jun. 2005.

* cited by examiner

*Primary Examiner* — Truong Vo
(74) *Attorney, Agent, or Firm* — J. B. Kraft; John D. Flynn

(57) ABSTRACT

Creating, i.e. rendering, markup language documents having multiple content portions, respectively, from multiple sources. A set of displayable non-alphanumeric visual indicators, e.g. colors, is associated with each content portion, each indicator respectively representing the status of one of said set of content reviews. Then an implementation is provided enabling a user at the receiving display station to sequentially and collectively proceed through said sets of content reviews to which the content portions in the multiple content displayed may have been subjected, and displaying at each content review step only the indicators representing the status of said content review for all of the content portions subjected to said content review step.

17 Claims, 8 Drawing Sheets

SYSTEM FOR CREATING MARKUP LANGUAGE DOCUMENTS AT A RECEIVING DISPLAY STATION FROM MULTIPLE SOURCES WITH MARKUP FOR DISPLAYING THE STATE OF SETS OF CONTENT REVIEWS

CROSS-REFERENCE TO RELATED COPENDING PATENT APPLICATIONS

The following patent application assigned to the assignee of the present invention and filed on Jun. 16, 2005, covers subject matter related to the subject matter of the present invention: A SYSTEM FOR CREATING MARKUP LANGUAGE DOCUMENTS AT A RECEIVING DISPLAY STATION HAVING MULTIPLE CONTENTS FROM MULTIPLE SECURED SOURCES ON A COMMUNICATION NETWORK, E.G. THE WEB WITH VISUAL INDICATORS FOR IDENTIFYING CONTENT AND SECURITY, Hately et al.

TECHNICAL FIELD

The present invention relates to a system, method and program for creating markup language documents, the contents of which are obtained from multiple sources from computer networks, such as the World Wide Web (Web) or Internet.

BACKGROUND OF RELATED ART

The past decade has been marked by a technological revolution driven by the convergence of the data processing industry with the consumer electronics industry. The effect has driven technologies that have been known and available and relatively quiescent over the years. Two of these technologies are the Internet related distribution and object oriented programming systems. Both of these technologies are embodied in the use of object oriented technology and the Java programming system, in particular, for a wide variety of consumer and business purposes over the Internet or Web or like private networks. For details and background with respect to the Java system, reference may be made to a typical text, *Just Java*, 2nd Edition, Peter van der Linden, Sun Microsystems, 1997. With the development and rapid expansion of the Web and other like networks, hypertext markup languages became the primary vehicle for distribution of data over such networks. A basic hypertext language, HTML, is described in detail in the above-entitled *Just Java* text, particularly at Chapter 7, pp. 249-268, dealing with the handling of Web pages; and also in the text, *Mastering the Internet*, G. H. Cady et al., published by Sybex Inc., Alameda, Calif., 1996, particularly at pp. 637-642, on HTML in the formation of Web pages. The Web pages are implemented so as to be used for the distribution of Web documents containing text, images, both still and moving, and sound, as well as programs.

The rapid expansion of people, businesses and organizations with Web or Internet (used interchangeably) access, has resulted in the widespread use of the Web for business, e.g. e-business and like electronic business, educational, medical and legal transactions. The complexity of the interrelationships involved in these transactions has made it common to handle and distribute Web or like private network documents having multiple contents respectively from multiple sources on the network. Such sources may be individual users at network display stations, as well as network databases that provide already developed and stored content. With the greater reliance on the impersonal network communication, there is less personal contact between the contributors of the content of these network documents. This makes it much harder for a participating user in a network transaction to recognize who contributed what to the document. The above cross-referenced copending application provides an implementation for tracking, storing and displaying via visual indicators, the sources of the various content portions in any markup language document created or rendered from multiple sources.

While this is an effective implementation in tracking Web or like network sources of document content portions, further problems are encountered when the document being created from multiple content sources has content portions that require sets of content reviews. The results of these content reviews are very important to both the host controlling the document sources, as well as to those creating the multiple content portions for the multiple content network document. In today's electronic commerce, for example, in the creation of network documents with content portions from multiple sources, the content portions of the variety of sources may have been subjected to sets of content reviews for many purposes. For example, a business company preparing to ship thousands of a specially designed and manufactured device may be generating a multi-content Web document having sets of reviews including approved legal reviews, approved accounting reviews, approved quality reviews, as well as time stamps and like commitments. Accordingly, in such a multiple content portioned network, e.g. Web documents, it is important not only to be enabled to identify the sources of the portions but to be able to present to the user or viewer at a display terminal, a user friendly Graphical User Interface (GUI) that shows the status of reviews.

SUMMARY OF THE PRESENT INVENTION

The present invention offers an implementation for a user at a network display station who is reviewing or developing a network, e.g. Web document, that will easily indicate the status of sets of content reviews to which each content portion has been subjected to a multiple content portion displayed document. Accordingly, there is provided a system for creating markup language, e.g. hypertext documents having multiple contents, respectively, from multiple sources comprising means for providing multiple contents for a created hypertext markup language document from a plurality of sources, including interactive display stations and means for displaying the created markup language document at an interactive network display station.

Each content portion has already been subjected to a set of content reviews, e.g. the source file or a source document, from which the content portion has been taken and has been subjected to one or more content reviews. There is provided a set of displayable non-alphanumeric visual indicators associated with each content portion, each indicator respectively representing the status of one of said set of content reviews. Then an implementation is provided enabling a user at the receiving display station to sequentially and collectively proceed through said sets of content reviews to which the content portions in the multiple content displayed may have been subjected, and displaying at each content review step only the indicators representing the status of said content review for all of the content portions subjected to said content review step.

The set of displayable non-alphanumeric visual indicators associated with each content portion are preferably a set of colors. Also, provision is made for the verification of any content review that may typically be verified by required signatures or time stamps.

The implementation enabling a user to sequentially and collectively proceed through said sets of content reviews may include means for rendering, at each content review step, a displayed overlay image of only the indicators representing the status of all content portions subject to said content review.

One usual implementation of the present invention would involve the network as the Web, a document created with XML protocols and an XML electronic signature.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
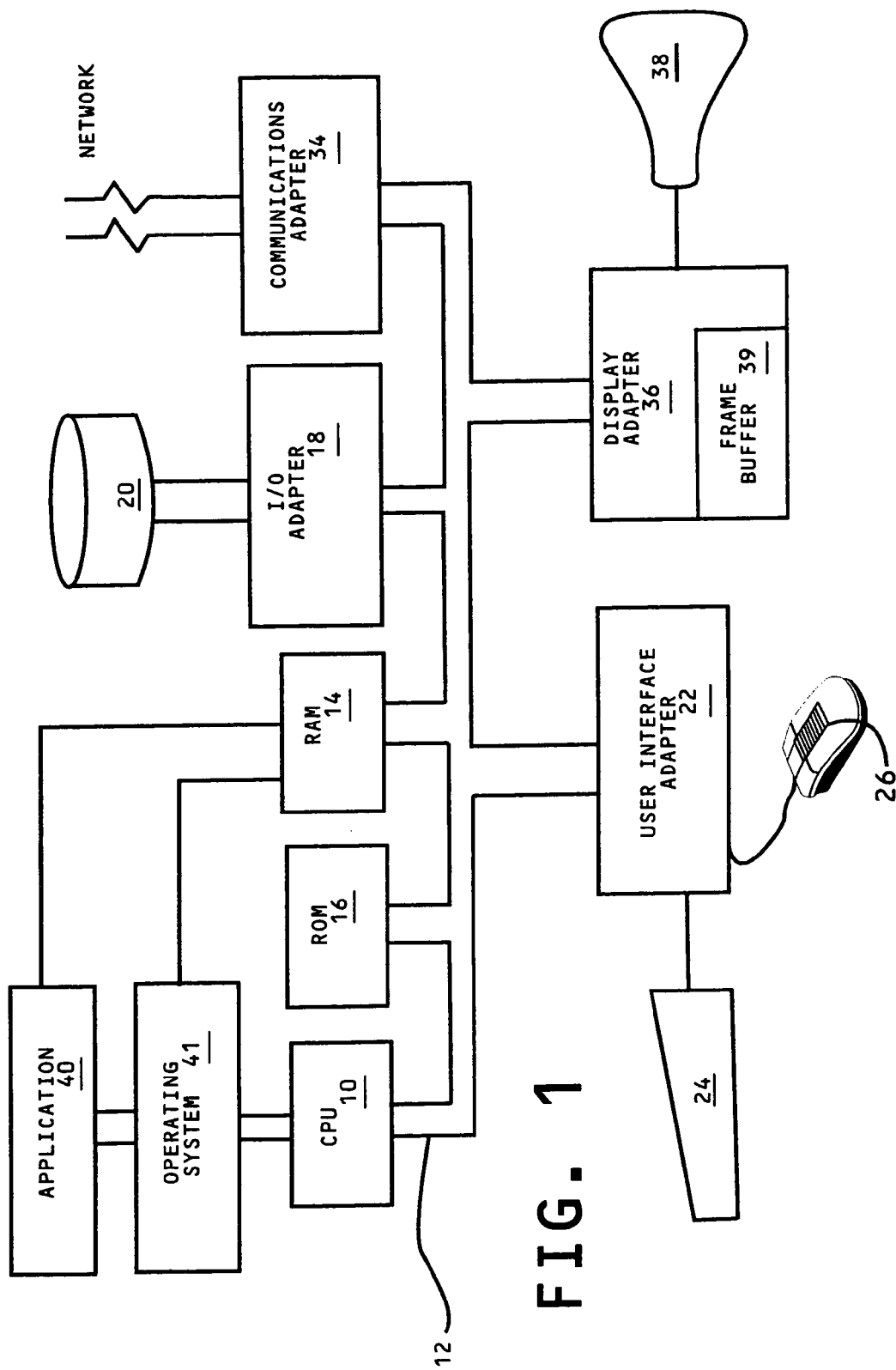
FIG. 1 is a block diagram of a data processing system including a central processing unit and network connections via a communications adapter that is capable of functioning both as a server computer and a client display station in the network of the present invention.

Referring to FIG. 1, a typical data processing unit is shown that may function as the network display stations used for receiving the Web documents having the multiple contents, respectively, from multiple sources or function as the Web or network server computers for accessing each of the multiple contents from their sources on the Web in the present embodiment wherein the Web is the illustrative network. A central processing unit (CPU) 10, such as one of the PC microprocessors or workstations, available from International Business Machines Corporation (IBM) or Dell PC microprocessors, is provided and interconnected to various other components by system bus 12. An operating system 41 runs on CPU 10, provides control and is used to coordinate the function of the various components of the computer of FIG. 1. Operating system 41 may be one of the commercially available operating systems, such as IBM's AIX or Microsoft's WindowsMe™ or Windows 2000™, as well as UNIX and other IBM AIX operating systems. Application programs 40, controlled by the system, are moved into and out of the main memory Random Access Memory (RAM) 14. These programs include the object oriented programs of the present invention for the use of visual indicators to represent the states of content reviews for the multiple content portions in the markup language document having multiple content portions on the display screens of the receiving Web stations. These functions will be described hereinafter in combination with conventional Web browsers (browsers 53, FIG. 2) at Web display stations 56 (FIG. 2), such as Microsoft's Internet Explorer™.

A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network. I/O devices are also connected to system bus 12 via user interface adapter 22 and display adapter 36. Keyboard 24 and mouse 26 are all interconnected to bus 12 through user interface adapter 22. It is through such input devices that the user at the Web display stations may interactively relate to the Web server programs for providing the markup language, e.g. hypertext documents of the present invention wherein color indicators are used to represent the states of content reviews for the multiple content portions in the markup language document having multiple content portions.

Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 2:
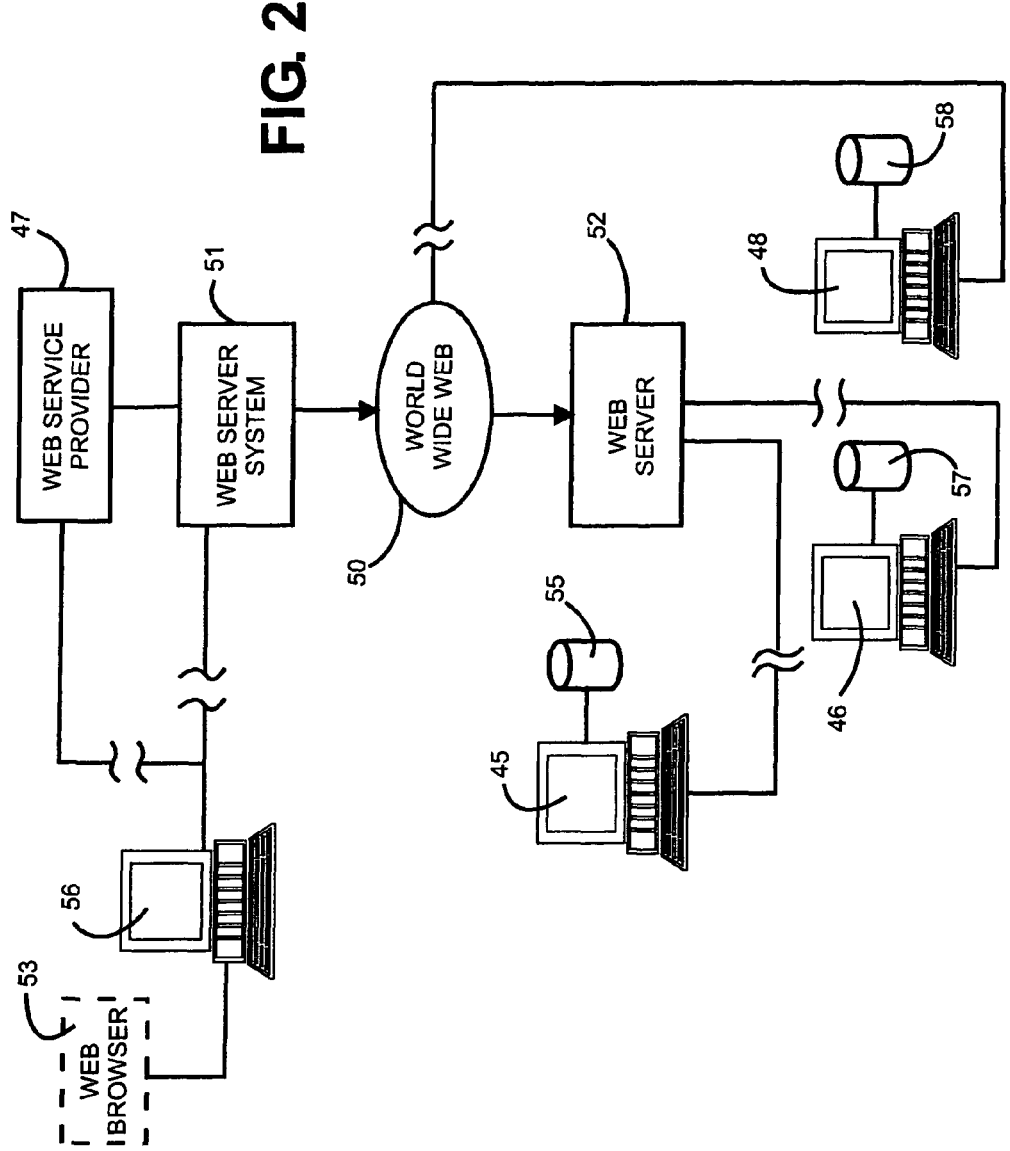
FIG. 2 is a generalized diagrammatic view of a network portion, i.e. a server computer connected to a Web portion, to illustrate how the present invention provides visual indicators to represent the states of content reviews for the multiple content portions in the markup language document having multiple content portions.

A generalized example of the practice of the present invention wherein color indicators are used to represent the states of content reviews for the multiple content portions in markup language documents having multiple content portions, and the respective multiple contents in displayed network documents formed from corresponding multiple sources will be considered with respect to FIG. 2. It shows a generalized portion of the Web that serves as the illustrative communication network in this embodiment of the present invention. First, it should be helpful to understand from a more general perspective the various elements and methods that may be related to the present invention. Since the present invention is applicable to Web markup language hypertext documents formed by multiple content portions, respectively, from multiple sources on the Web, an understanding of the Web and its operating principles would be helpful. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996. (Web and Internet are used interchangeably in this description.)

The Internet or Web is a global network of a heterogeneous mix of computer technologies and operating systems. Higher level objects are linked to lower level objects in the hierarchy through a variety of network server computers. These network servers are the key to network distribution, such as the distribution of Web pages and related documentation.

Web documents are conventionally implemented in a markup language, e.g. HTML, which is described in detail in the text, *Just Java*, 2nd Edition, Peter van der Linden, Sun Microsystems, 1997, particularly at Chapter 7, pp. 249-268, dealing with the handling of Web pages; and also in the text, *Mastering the Internet*, particularly at pp. 637-642, on HTML in the formation of Web pages. In addition, aspects of this description will refer to Web browsers. A general and comprehensive description of browsers may be found in the above-mentioned *Mastering the Internet* text at pp. 291-313. More detailed browser descriptions may be found in the text, *Internet: The Complete Reference, Millennium Edition*, M. L. Young et al., Osborne/McGraw-Hill, Berkeley Calif., 1999, Chapter 19, pp. 419-454, on the Netscape Navigator; Chapter 20, pp. 455-494, on the Microsoft Internet Explorer; and Chapter 21, pp. 495-512, covering Lynx, Opera and other browsers.

Within this environment, Web Services distribution has evolved in recent years. Web Services are based on both suppliers of the data in the form of XML based messages and documents and applications consuming such data conforming to several industry standards developed by the W3C. The primary standard is XML (Extended Markup Language) for defining data and creating markup languages in the form of XML tags. The resulting XML documents are text based on and, thus, may be processed on any platform in the distribution of the Web Services. In light of this background, reference is made to FIG. 2 showing a portion of the Web or Internet set up for the distribution of text based data. Thus, data content in the form of HTML or other XML document portions may be transmitted over the Web and entered into receiving Web documents at receiving Web display stations. For purposes of the present embodiment, let computer station 56, FIG. 2, serve as a typical Web display station for receiving or sending Web documents. As will be described hereinafter with respect to the display interfaces of FIGS. 3 through 6 and the programs of FIGS. 7 and 8, the Web documents having the multiple content portions are displayed on computer display station 56, and the states of content reviews for the multiple content portions in markup language documents are defined therein by the color indicators, as will be hereinafter described in greater detail with respect to FIGS. 3 through 8. Under the control of any conventional Web browser 53 in computer 56, the selected multiple data content portions from multiple sources are combined into composite Web documents. The portion of the Web shown has four participating Web display stations 56, 45, 46 and 48, with the latter three having associated databases 55, 57 and 58. For purposes of this illustration, we are displaying the composite Web document with multiple content portions from multiple sources at Web display station 56 under control of Web browser program 53 operating via a conventional Web server system 51, via the Web 50 to any of the multiple content from any of databases 55, 57 and 58, respectively, associated with Web display stations 45, 46 and 48 or from input made by users at any of terminals 45, 46 and 48.

It will also be understood that instead of any conventional Web server, system 51 may be replaced by a server system of a service provider 47 that will conventionally perform this Web server function along with other Web service provider functions. Thus, the composite Web document with content contributions from the multiple display stations 56, 45, 46 and 48 or associated databases 55, 57 and 58 is to be displayed at display station 56 in the format shown in FIG. 3. This composite Web document with multiple content from multiple sources could also be selectively displayed on any of Web display stations 45, 46 or 48.

Figure 3:
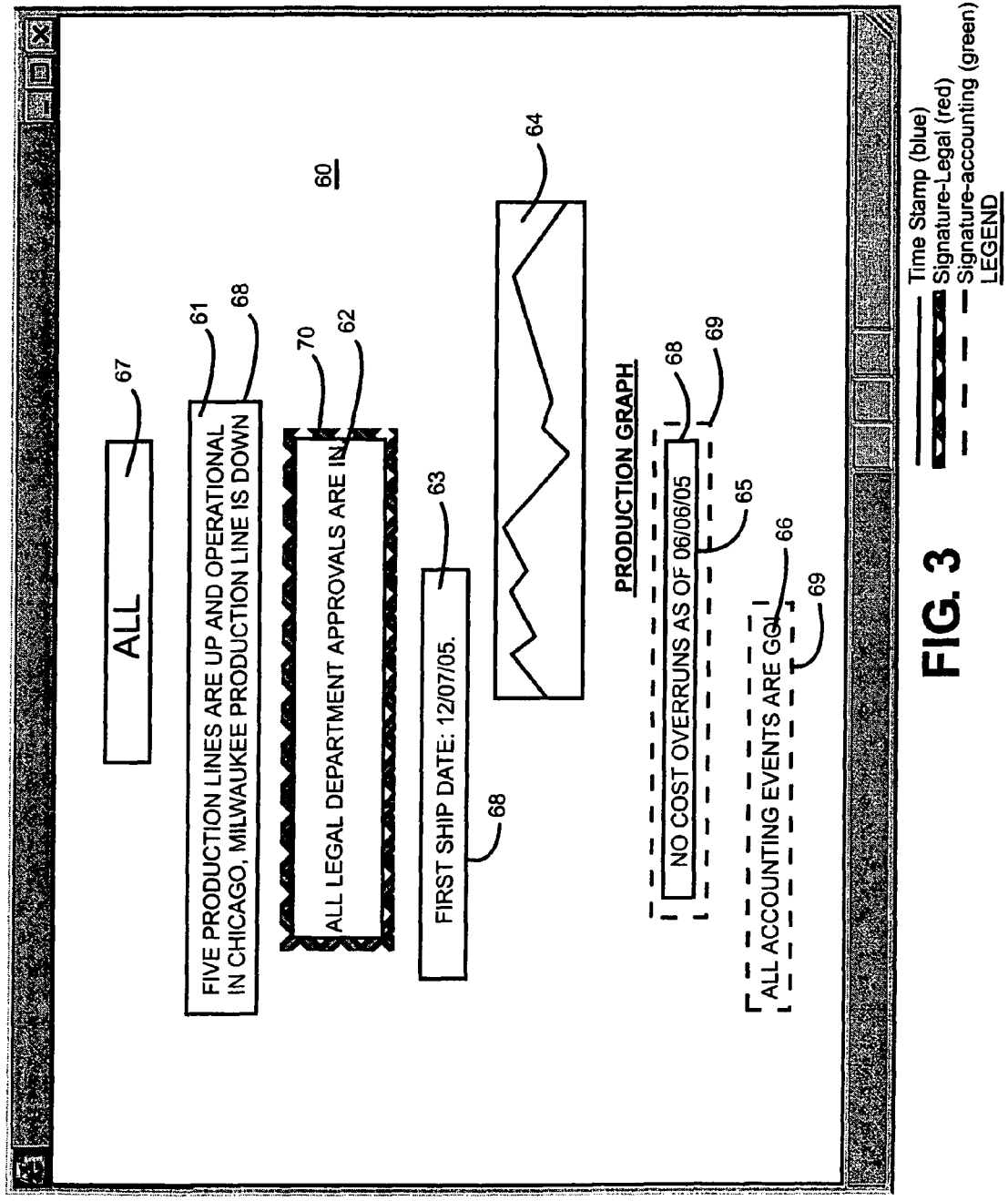
FIG. 3 is an illustrative interactive display showing an illustrative page of a Web document to illustrate how the present invention provides visual indicators to represent the states of content reviews for the multiple content portions in the markup language document having multiple content portions.

With reference to FIG. 3, the display screen 60, as shown, has a displayed text document at the stage where there have been contributions of content to the document from multiple sources. The sources of the various content portions 61, 62, 63, 64, 65 and 66 may be defined so as to inform the user as to the identification of the source. This may be done simply by an attached text I.D. or it may be done by other visual indicators as described in the above-referenced copending patent application. In order to simplify the illustration of the present invention, such indicators have been removed. However, it should be noted that if color indicators of the copending application are used, such indicators should be distinct from the color indicators used for the present invention.

Content portions 61-66 have been accessed from various sources. These portions represent portions of documents, files or e-mail message input from sources that will have already been subjected to sets of content reviews at the sources. For example, if the illustration where the composite document shown in FIG. 3 is in a business and manufacturing organization shipping a product, then the sources providing the respective content portions will have already been subjected to similar sets or groups of reviews, e.g. legal departments, accounting departments, testing departments, shipping departments, etc., and electronic signatures or sign-offs obtained from such departments. Also, because of the need for coordination of scheduling of the various functions in the organization, appropriate time stamps have been provided for the source files and documents.

The composite document in FIG. 3 shows the states of all of the sets of content reviews for all content portions 61-66. These are shown through visual indicators, e.g. colored borders 68, 69 and 70, each representing a different content review status in its respective set, i.e. as defined in the bottom LEGEND, blue border 68 represents an illustrative time stamp; green border 69 represents an accounting verified signature; and red border 70 a verified legal signature. It should be noted that a content portion, such as portion 65, may have a plurality of colored borders indicating several content reviews while others, such as portion 64, will have no colored borders that indicates that there have been no associated content reviews.

It should be understood that for interaction with the elements in display 60, the user may use a conventional mouse, pointer and/or cursor (not shown). Also, in order to access the individual stages of content reviews, as will be described subsequently with respect to FIGS. 4 through 6, the user may interactively access a menu through entry window 67, which for FIG. 3 shows the "All" item indicating that the states of all content reviews for all of the content portions are being displayed. The numbers of content review states have been simplified to only a few for purposes of illustration. In an actual display screen of such a composite document, the numbers of color indicators would likely be much greater and, consequently, potentially more confusing.

Figure 4:
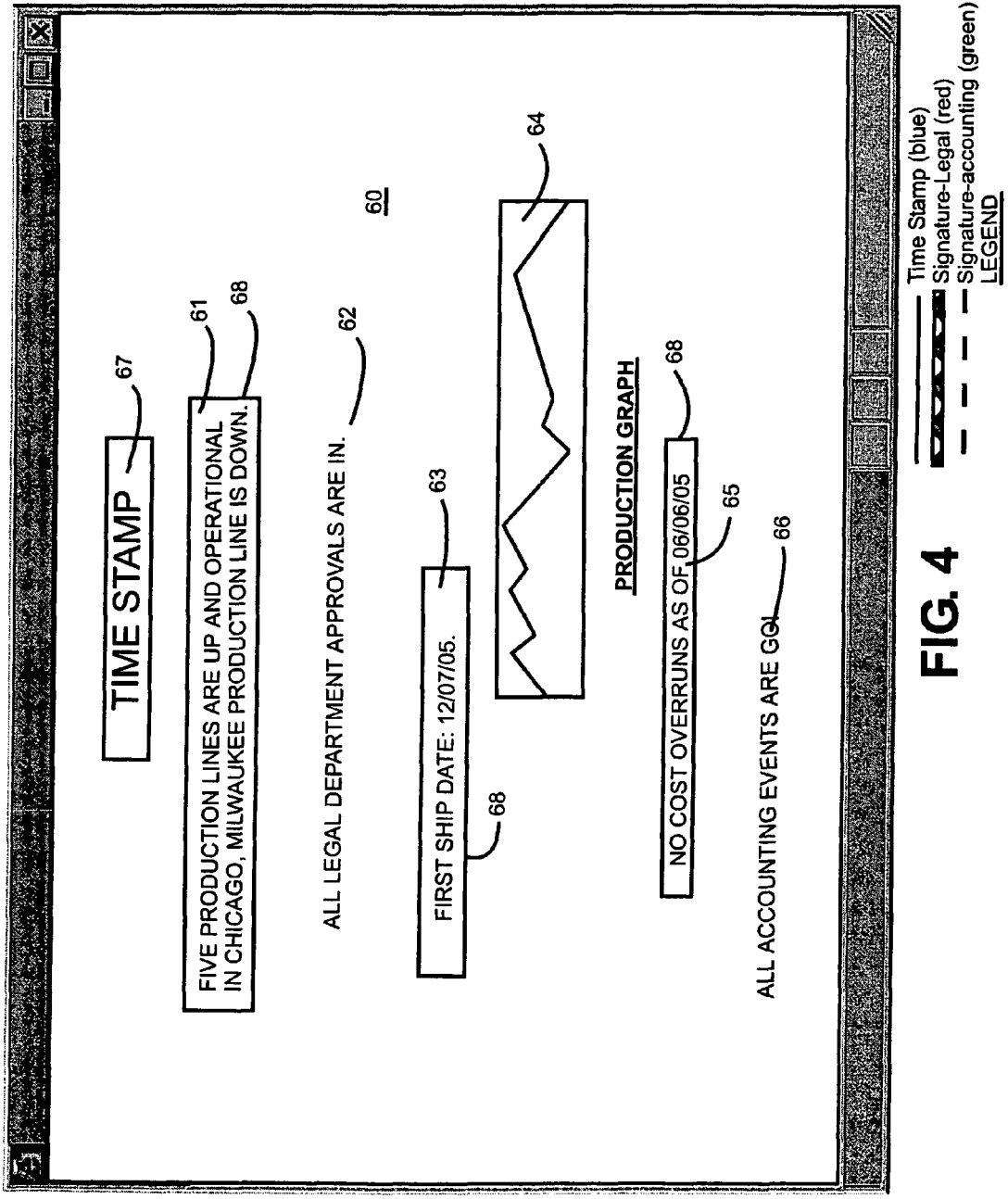
FIG. 4 is the interactive display of FIG. 3 at one stage, the time stamp stage, as the user sequentially and collectively proceeds through said sets of content reviews to which the content portions in the multiple content displayed may have been subjected, and displays at each content review step only the indicators representing the status of said content review for all of the content portions subjected to said content review step.
Figure 5:
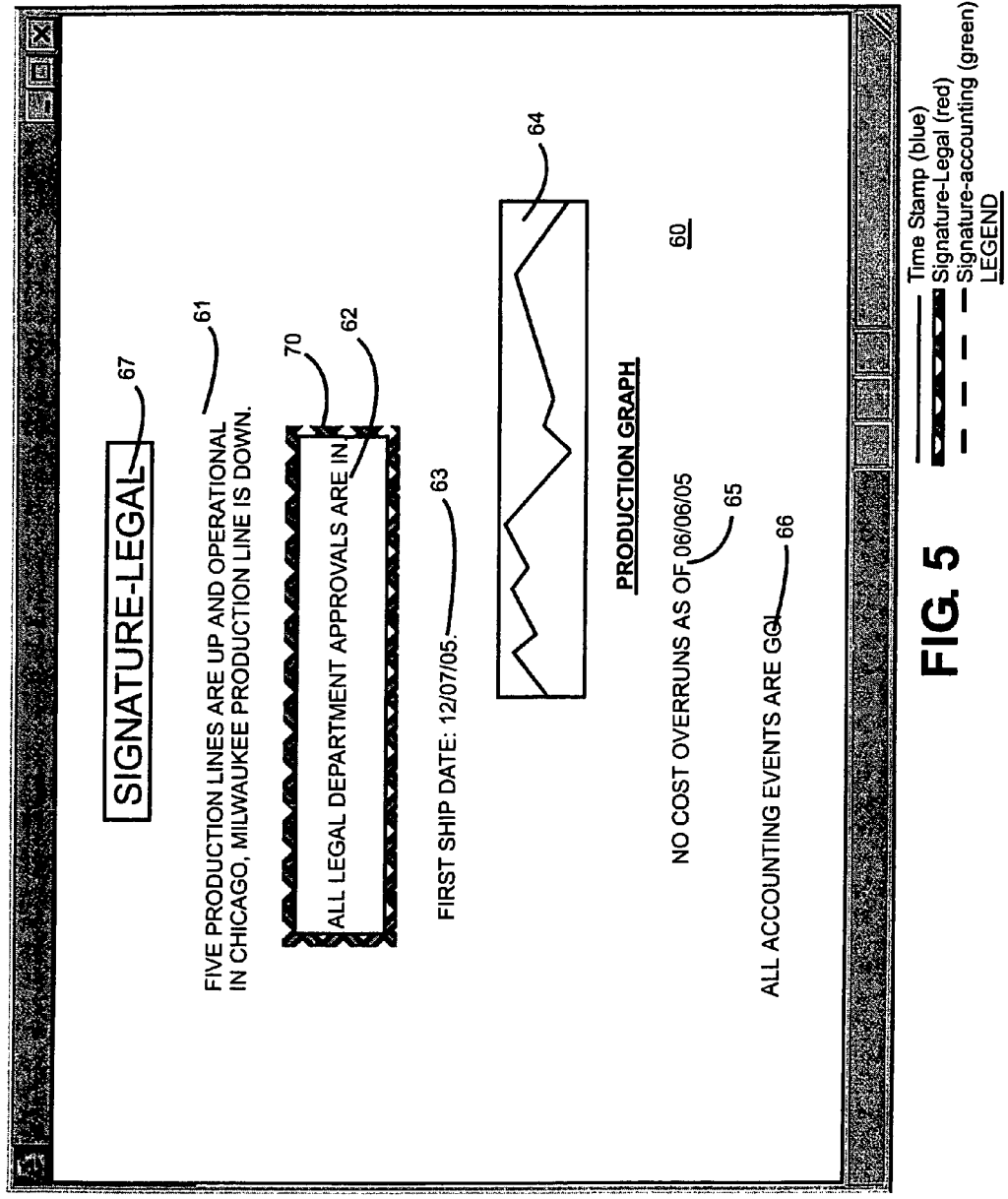
FIG. 5 is the interactive display of FIG. 4 at a subsequent stage, the signature stage of content review by the legal function in an organization.
Figure 6:
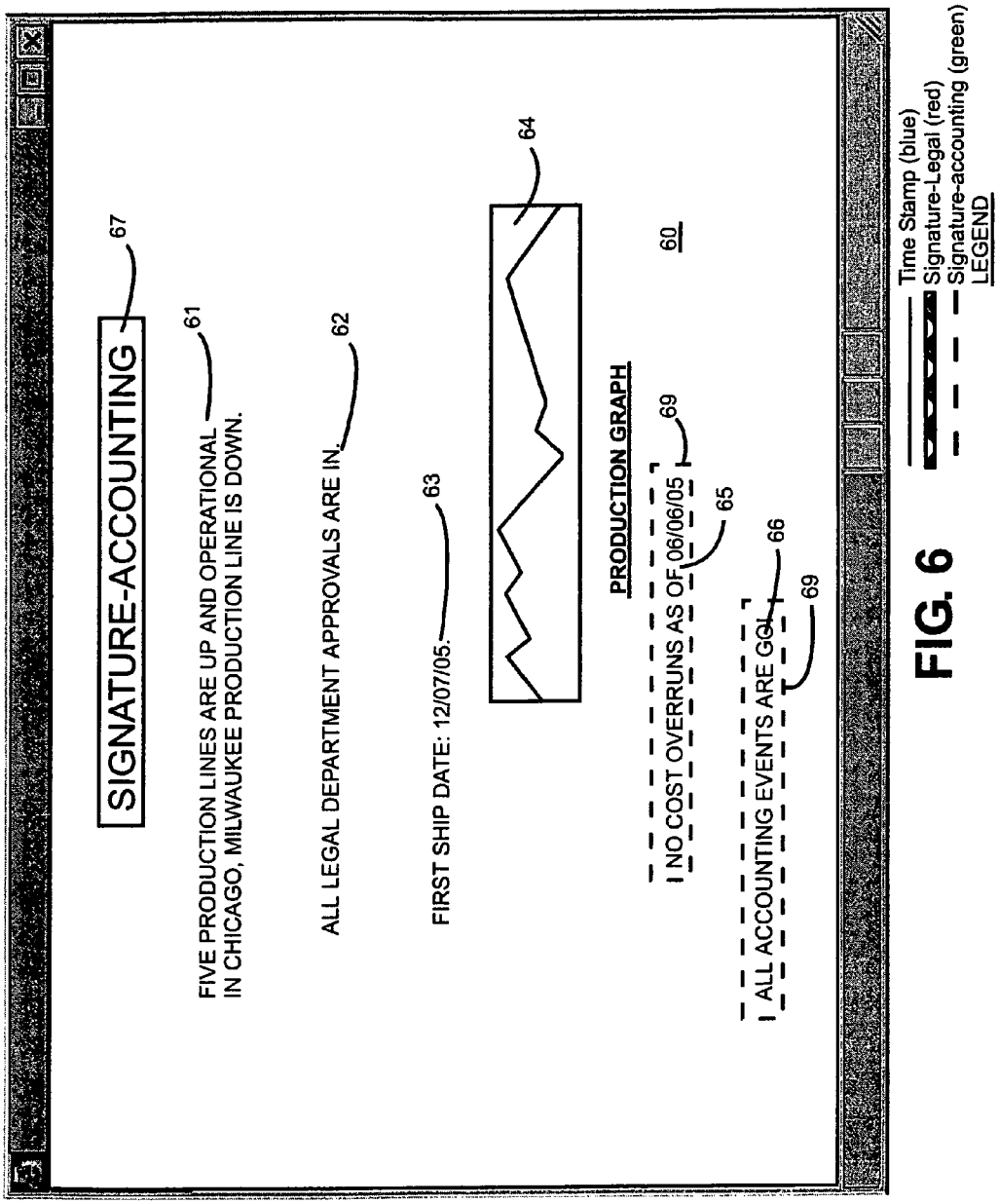
FIG. 6 is the interactive display of FIG. 5 at a subsequent stage, the signature stage of content review by the accounting function in an organization.

For such circumstances, the present invention provides for an implementation as shown in FIGS. 4 through 6 of enabling a user to sequentially and collectively proceed through said sets of content reviews and rendering at each content review step, a displayed overlay image of only the indicators representing the status of all content portions subject to said content review. Thus, in FIG. 4, responsive to an item selection in window 67 to define only content portions that have a particular time stamp review status, the display screen shows only the color indicator 68 for content portions 61, 63 and 65. In FIG. 5, responsive to an item selection in window 67 to define only content portions that have a legal signature review status, the display screen shows only the color indicator 70 for content portion 62. In FIG. 6, responsive to an item selection in window 67 to define only content portions that have an accounting signature review status, the display screen shows only the color indicator 69 for content portions 65 and 66.

Users may wish to verify the content review states, e.g. signatures represented by the particular color for a particular content portion. There are many known procedures for signature verification and it is beyond the scope and purpose of the present invention to describe such verification schemes. Some illustrations by way of background, electronic signatures are one accepted way of determining review and security status. Electronic signatures are used in the transmission and opening of markup language, e.g. HTML documents, to indicate the security of the content. The current standard electronic HTML security signature is the XML signature that is defined by W3C standard for XML signatures. Some defined requirements for XML signatures are: the signature must be based on an RDF (Resource Description Framework) Model; the signature must apply to any resource addressable by a locator—including non-XML content; references are identified with XML indicators; the signatures must be applicable to a part or the totality of the XML document; multiple XML signatures must be able to exist over the static content of a Web resource given varied keys, content transformations and algorithm specifications; XML signatures are first class objects themselves and consequently must be able to be referenced and signed; the specification must permit the use of varied digital signature and message authentication codes, such as symmetric and asymmetric authentication schemes, as well as dynamic agreement of keying material.

The interactive display screens of FIGS. 3 through 6 may be used to convey signature verification information to the interactive user. Provision may be made for the situation wherein the user at the receiving station may be concerned and want to verify the basis for any particular color designation indicating a signature status. In such a case, an implementation may be provided whereby the receiving user interactively selects to have further details to verify a signature, e.g. the user may use a mouse pointer to click on the color frame enclosing a content portion. This will result in the display of details, such as how the signature status of the content portion was determined.

Figure 7:
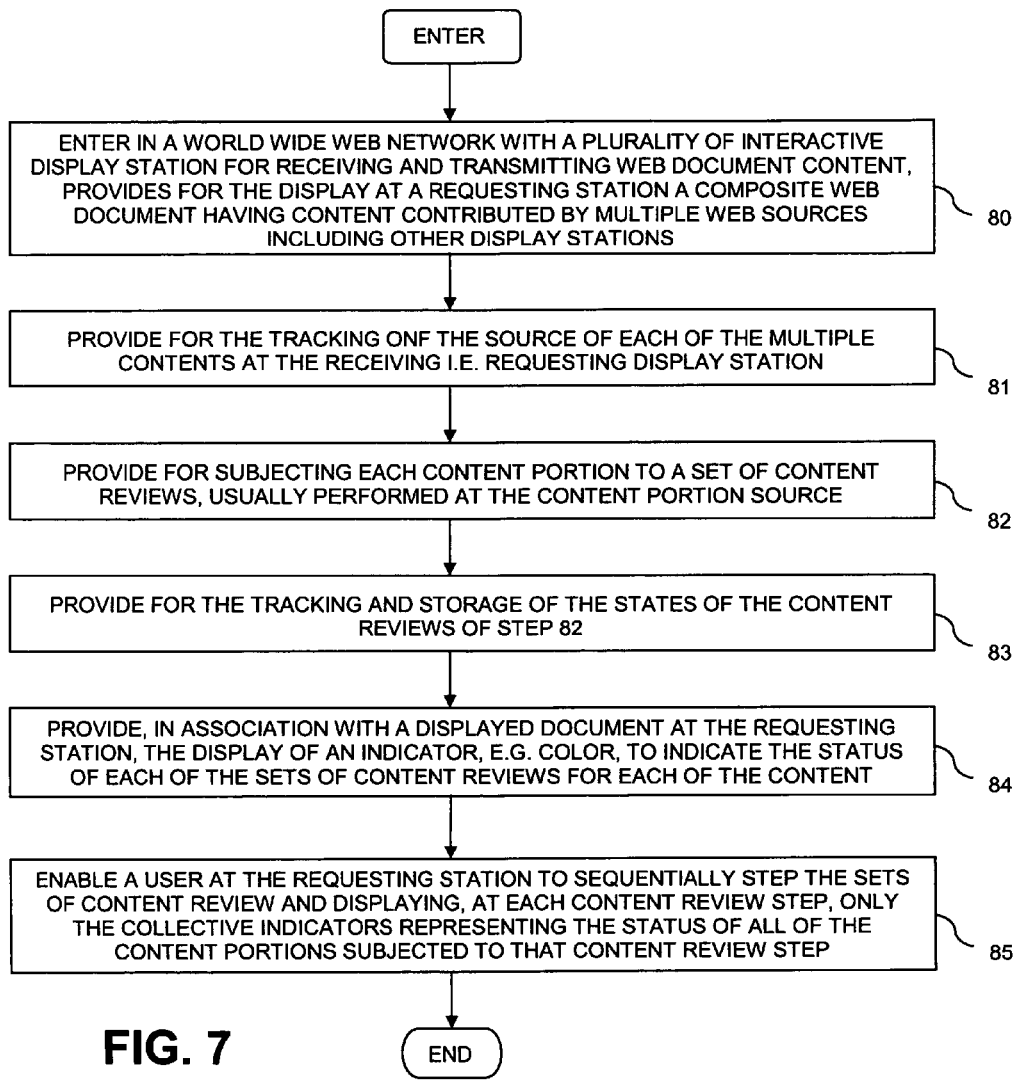
FIG. 7 is an illustrative flowchart describing the setting up of the elements of the present invention for the provision of visual indicators to represent the states of content reviews for the multiple content portions in the markup language document having multiple content portions.
Figure 8:
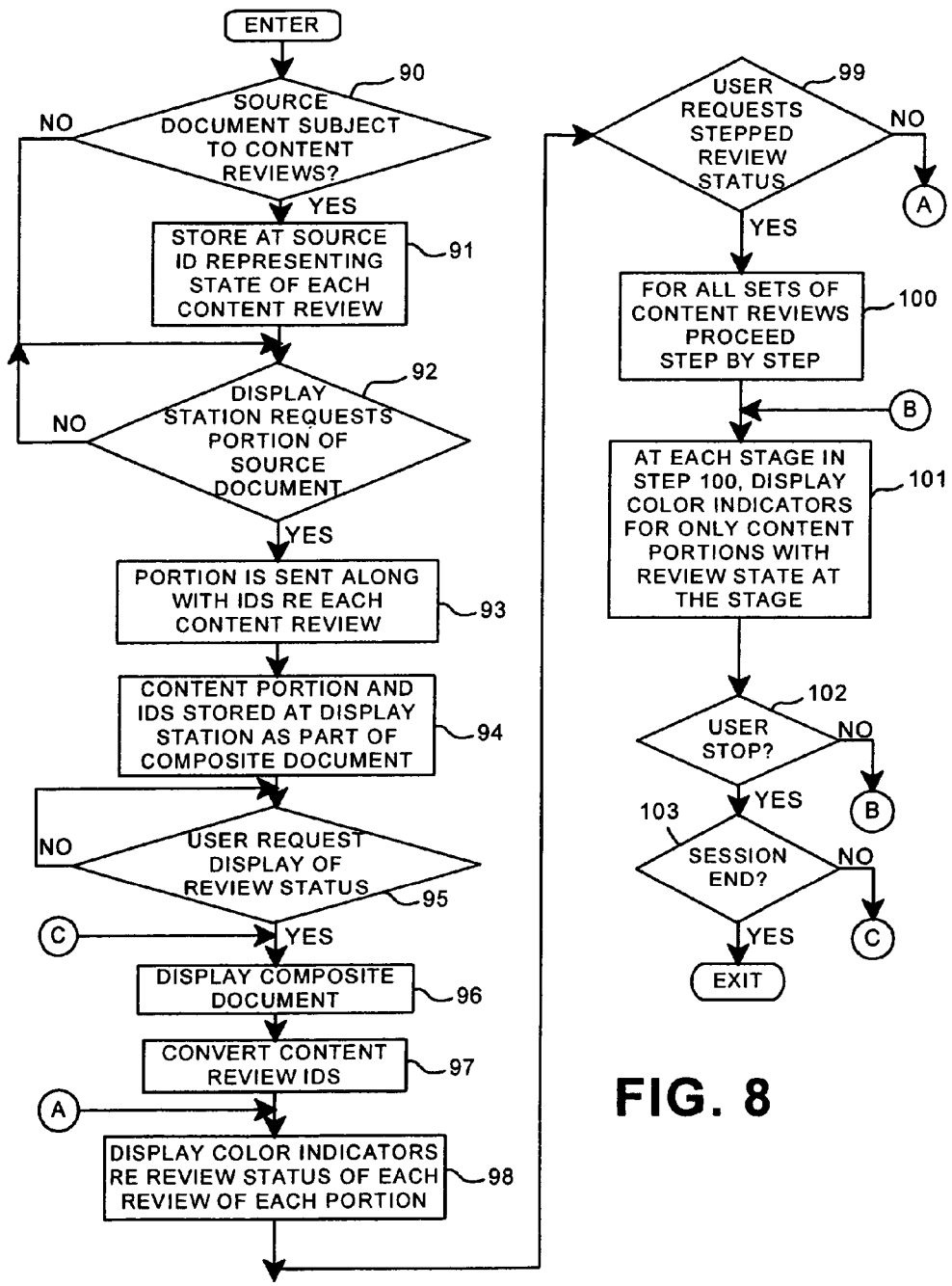
FIG. 8 is a flowchart of an illustrative run of the program set up in FIG. 7.

Now, with reference to FIGS. 7 and 8 there will be described a process implemented by the present invention in conjunction with the flowcharts of these figures. FIG. 7 is a flowchart showing the development of a process according to the present invention for color indicators used to represent the states of content reviews for the multiple content portions in markup language documents having multiple content portions.

In a Web network with a plurality of interactive display stations for receiving and transmitting Web document content, provision is made for the display at an appropriate requesting station of a composite Web document having content contributed from multiple Web sources including databases and other display stations, step 80. Provision is made for the tracking of the source of each of the multiple content portions at the requesting receiving display station, step 81. Provision is made for subjecting each content portion to a set of content reviews, usually carried out at the source of the content portion, step 82. Provision is made, step 83, for the storage of the states of content reviews of step 82. There is provided in association with a displayed document at a requesting display station a visual indicator, e.g. color, to indicate the status of each of the sets of content reviews for each of the content portions, step 84. The user at the requesting display station is enabled, step 85, to sequentially step through the sets of content reviews and to display at each content review step only those indicators that collectively represent the status of all of the content portions subjected to that particular content review stage.

An illustrative run of the process set up in FIG. 7 will now be described with respect to FIG. 8. First, step 90, a determination is made at the source of data from which the document portions are to be accessed as to whether the data has been subjected to content reviews. If Yes, step 91, there is stored at the source, I.D.'s representing the state or status of each content review. Then, or if the decision in step 90 is No, a request for a content portion by a requesting display station is awaited, step 92. If Yes, a request for content portion is made, then, step 93, the requested portion is sent along with the appropriate I.D.'s representing the states of all content reviews. The requested content portion and associated I.D.'s are stored at the requesting display station, step 94. When Yes, step 95, the user requests the display of review states, then the composite document containing all requested content portions is displayed at the requesting station, step 96, the content review status I.D.'s are converted into representative colors, step 97, and the color indicators are displayed in association with their respective content portions, step 98. A further determination is made as to whether the user has requested a stepped display of collective content review status in stages as shown in FIGS. 4 through 6, step 99. If Yes, this procedure is carried out: the content reviews are presented on the display stage by stage, step 100, and at each stage, there are displayed the color indicators for only content portions a review state at that particular stage, step 101. If the decision at step 99 is No, then the process returns to step 98 via branch "A". At this point, step 102, a decision is made as to whether the user has stopped or completed his stepping through the review stages. If No, then the process returns to step 101 via branch "B". If Yes, then a further determination may be conveniently made as to whether the session is ended, step 103. If Yes, the session is exited. If No, then the process returns to step 96 via branch "C".

Although certain preferred embodiments have been shown and described, it will be understood that many changes and modifications may be made therein without departing from the scope and intent of the appended claims.

What is claimed is:

1. In a communication network with user access via a plurality of data processor controlled interactive network display stations, a method for creating markup language documents having multiple content portions respectively from multiple sources comprising:

provide multiple content portions for a created markup language document from a plurality of sources including said interactive display stations;

displaying said created markup language document at an interactive network display station;

subjecting each content portion to a set of content reviews from a plurality of different reviewing functions;

displaying, in association with each content portion, a set of displayable different color visual indicators, each color indicator respectively representing the status of one of said set of content reviews from a different one of said set of reviewing functions; and enabling a user at said display station to sequentially step through said sets of content reviews by displaying at each content review step, only the indicator representing the status of said content review for all of the content portions subjected to said content review by the reviewing function for said step.

2. The method for creating network markup language documents of claim 1 further including the step of verifying the status of any of said set of content reviews for any of said content portions.

3. The method for creating network markup language documents of claim 2 wherein the status of at least one of said set of content reviews is a verified time stamp.

4. The method for creating network markup language documents of claim 2 wherein the status of at least one of said set of content reviews is a verified signature.

5. The method for creating network markup language documents of claim 4 wherein:
said network is the World Wide Web;
said document is created with XML protocols; and
said electronic signature is an XML signature.

6. The method for creating network markup language documents of claim 1 wherein said step of enabling a user to sequentially step through said sets of content reviews includes:
rendering at each content review step, a displayed overlay image of only the indicators representing the status of all content portions subject to said content review.

7. A computer usable non-transitory storage medium having stored thereon, a computer readable program for creating markup language documents having multiple content portions respectively from multiple sources in a communication network with user access via a plurality of data processor controlled interactive network display stations, wherein the computer program when executed on a computer causes the computer to:
provide multiple content portions for a created markup language document from a plurality of sources including said interactive display stations;
display said created markup language document at an interactive network display station;
subject each content portion to a set of content reviews from a plurality of different reviewing functions;
display, in association with each content portion, a set of displayable different color visual indicators, each color indicator respectively representing the status of one of said set of content reviews from a different one of said set of reviewing functions; and
enable a user at said display station to sequentially step through said sets of content reviews by displaying at each content review step, only the indicator representing the status of said content step review for all of the content portions subjected to said content review by the reviewing function for said step.

8. The computer usable medium of claim 7, wherein said computer program causes the computer to further verify the status of any of said set of content reviews for any of said content portions.

9. The computer usable medium of claim 8, wherein the status of at least one of said set of content reviews is a verified signature.

10. The computer usable non-transitory storage medium of claim 8, wherein said computer program when executed enables said user to sequentially step through said sets of content by rendering at each content review step, a displayed overlay image of only the indicators representing the status of all content portions subject to said content review.

11. The computer usable non-transitory storage medium of claim 7, wherein:
said network is the World Wide Web;
said document is created with XML protocols; and
said electronic signature is an XML signature.

12. In a communication network with user access via a plurality of data processor controlled interactive network display stations, a system for creating markup language documents having multiple content portions respectively from multiple sources comprising
a processor; and
a computer memory holding computer program instructions which when executed by the processor perform the method comprising:
providing multiple content portions for a created markup language document from a plurality of sources including said interactive display stations;
displaying said created markup language document at an interactive network display station;
subjecting each content portion to a set of content reviews from a plurality of different reviewing functions;
displaying, in association with each content portion, a set of displayable different color visual indicators, each color indicator respectively representing the status of one of said set of content reviews from a different one of said set of reviewing functions; and
enabling a user at said display station to sequentially step through said sets of content reviews by displaying at each content review step, only the indicator representing the status of said content review for all of the content portions subjected to said content review by the reviewing function for said step.

13. The system for creating network markup language documents of claim 12, wherein the performed method further includes the step of verifying the status of any of said set of content reviews for any of said content portions.

14. The system for creating network markup language documents of claim 13 wherein the status of at least one of said set of content reviews is a verified time stamp.

15. The system for creating network markup language documents of claim 13 wherein the status of at least one of said set of content reviews is a verified signature.

16. The system for creating network markup language documents of claim 15 wherein:
said network is the World Wide Web;
said document is created with XML protocols; and
said electronic signature is an XML signature.

17. The system for creating network markup language documents of claim 12 wherein said performed step of enabling a user to sequentially step through said sets of content reviews includes:
rendering at each content review step, a displayed overlay image of only the indicators representing the status of all content portions subject to said content review.

* * * * *